(No Model.)

W. S. HULL.
LATTICE.

No. 533,813. Patented Feb. 5, 1895.

Witnesses:
L. C. Hills.
E. A. Bond

Inventor:
William S. Hull.
by E. B. Stocking
Attorney

UNITED STATES PATENT OFFICE.

WILLIAM S. HULL, OF DALLAS, TEXAS.

LATTICE.

SPECIFICATION forming part of Letters Patent No. 533,813, dated February 5, 1895.

Application filed May 25, 1894. Serial No. 512,437. (No model.)

*To all whom it may concern:*

Be it known that I, WILLIAM S. HULL, a citizen of the United States, residing at Dallas, in the county of Dallas, State of Texas, have invented certain new and useful Improvements in Lattices and Lattice-Bars, of which the following is a specification, reference being had therein to the accompanying drawings.

This invention relates to certain new and useful improvements in lattice and the like, designed primarily for use in cells and jails and similar institutions, but of course applicable to any and all uses and places where such structures are required or are desirable.

It has for its objects among others to provide a lattice for the admission of light and air into prison cells and the like, which shall be simple, economical of construction, and stronger than any prior form of which I am aware. I form the lattice of bars which are formed with alternately opposite depressions and elevations for the reception of the bars running at right angles thereto. I may form these bars of any suitable material. For cell work they should usually be made of alternate layers of steel and iron such as is known to the trade as "three ply," "five ply" and chrome steel bars.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1:
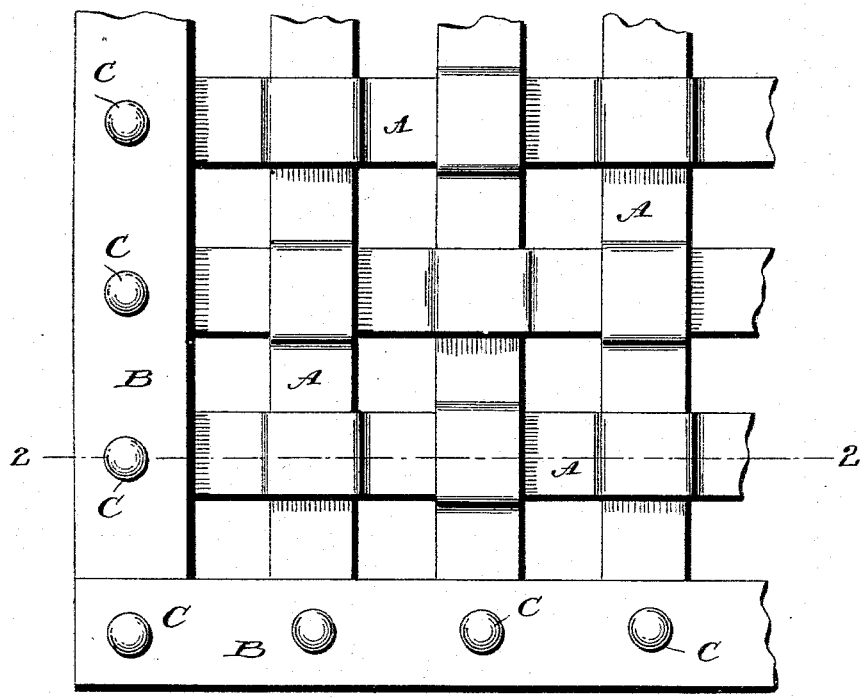
Figure 2:
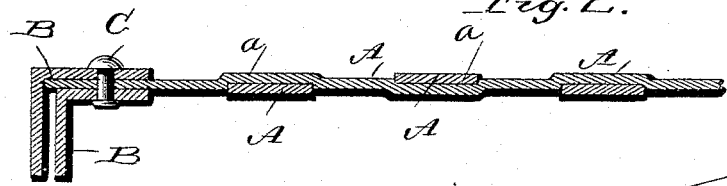
Figure 3:
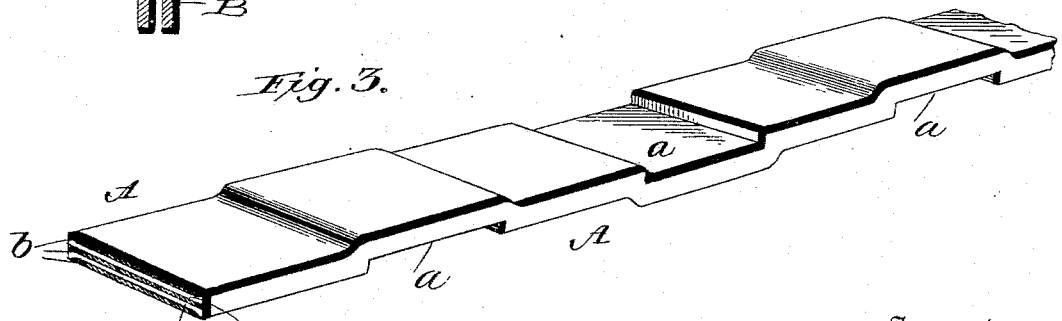

Figure 1 is an elevation of a portion of a lattice embodying my invention. Fig. 2 is a section on the line 2—2 of Fig. 1. Fig. 3 is a perspective view of a portion of one of the compound bars.

Like letters of reference indicate like parts in all of the views.

Referring now to the details of the drawings by letter, A designates one of the bars of my lattice. This bar may be of any desired material suited to the purpose for which the lattice is intended. This bar is rolled, pressed, hammered or otherwise treated to give it the shape shown in Fig. 3 where it will be seen to have the alternately arranged transverse channels or depressions and elevations $a$ having straight walls, these depressions or channels being designed to receive the bars which extend at right angles to the said bar as shown in Fig. 2. When designed for use in jail cells and other like places I may make the bar of alternate layers of iron and steel as shown in Fig. 3 in which $b$ are the iron layers and $c$ the steel layers, the whole being united in any well known way. Bars thus formed are woven into a lattice as seen in Fig. 1, the bars being woven in and out, like the warp and woof of cloth, the channels or depressions in the bars being so arranged and shaped that no further bending of the bars is required during the process of weaving, and having become seated in their proper positions one bar serves as a lock upon the others. No rivets or other fastenings are required at the points of intersection. The bars may be of any appropriate width and thickness and the mesh of the lattice may be made of any required size. It is my intention to make the bars usually of such a thickness as to make them practically rigid, this, of course in jail cell work, being an essential requirement.

The lattice work may be secured at the corners of the cells in any suitable manner. In Figs. 1 and 2 I have shown a convenient way. The end of each bar is arranged between the parallel portions of the angle plates B and there secured by the rivets or analogous means C, as shown.

Where there are long lengths required in a piece of work the lattice may be put up in sections and joined together when set up in any suitable manner.

I may use carbonized or case hardened iron or steel bars where occasion requires. The channels or depressions will of course vary in depth and width according to the width and thickness of the bars employed.

What I claim as new is—

The combination with a lattice formed of bars each with channels alternately oppositely arranged upon its opposite faces and each channel receiving a portion of another bar, of angle plates between which the ends of said bars are held and secured, substantially as specified.

In testimony whereof I affix my signature in presence of two witnesses.

WILLIAM S. HULL.

Witnesses:
WM. H. RUFFIN,
JNO. T. HULL.